United States Patent

Davis

[15] 3,646,834
[45] Mar. 7, 1972

[54] COUNTERROTATING OUTPUT TRANSMISSION

[72] Inventor: Charles S. Davis, New York, N.Y.
[73] Assignee: Curtiss-Wright Corporation
[22] Filed: Oct. 28, 1970
[21] Appl. No.: 84,565

[52] U.S. Cl. ..........................74/674, 74/665 GA, 74/665 K, 74/803
[51] Int. Cl. .........................................F16h 37/06, F16h 1/28
[58] Field of Search...........74/674, 665 GA, 801, 803, 665 K

[56] References Cited

UNITED STATES PATENTS

| | | | |
|---|---|---|---|
| 2,700,311 | 1/1955 | Baoe | 74/674 |
| 2,761,332 | 9/1956 | Gray et al. | 74/674 |
| 3,188,884 | 6/1965 | Bancroft | 74/665 K |
| 3,304,804 | 2/1967 | Oldfield et al. | 74/803 X |

*Primary Examiner*—Leonard H. Gerin
*Attorney*—Arthur Frederick and Victor D Behn

[57] ABSTRACT

The counterrotating output transmission comprises a planetary gear assembly connected to be rotatively driven by a source of rotary power and having three different sized output ring gears. The intermediate-sized ring gear is connected to rotate a first output shaft while the smallest and the largest ring gears are alternatively connected to rotate a second output shaft in a direction counter to the first output shaft. A clutch assembly is provided to coact with the smallest and largest ring gears to alternately connect the ring gears to the second output shaft and thereby shift the reaction load of the planetary gear assembly radially and cause reverse rotation of ring gears and, hence, change the direction of rotation of each of the first and second counterrotating output shafts.

11 Claims, 5 Drawing Figures

PATENTED MAR 7 1972

INVENTOR.
CHARLES S. DAVIS
BY
Arthur Frederick
ATTORNEY

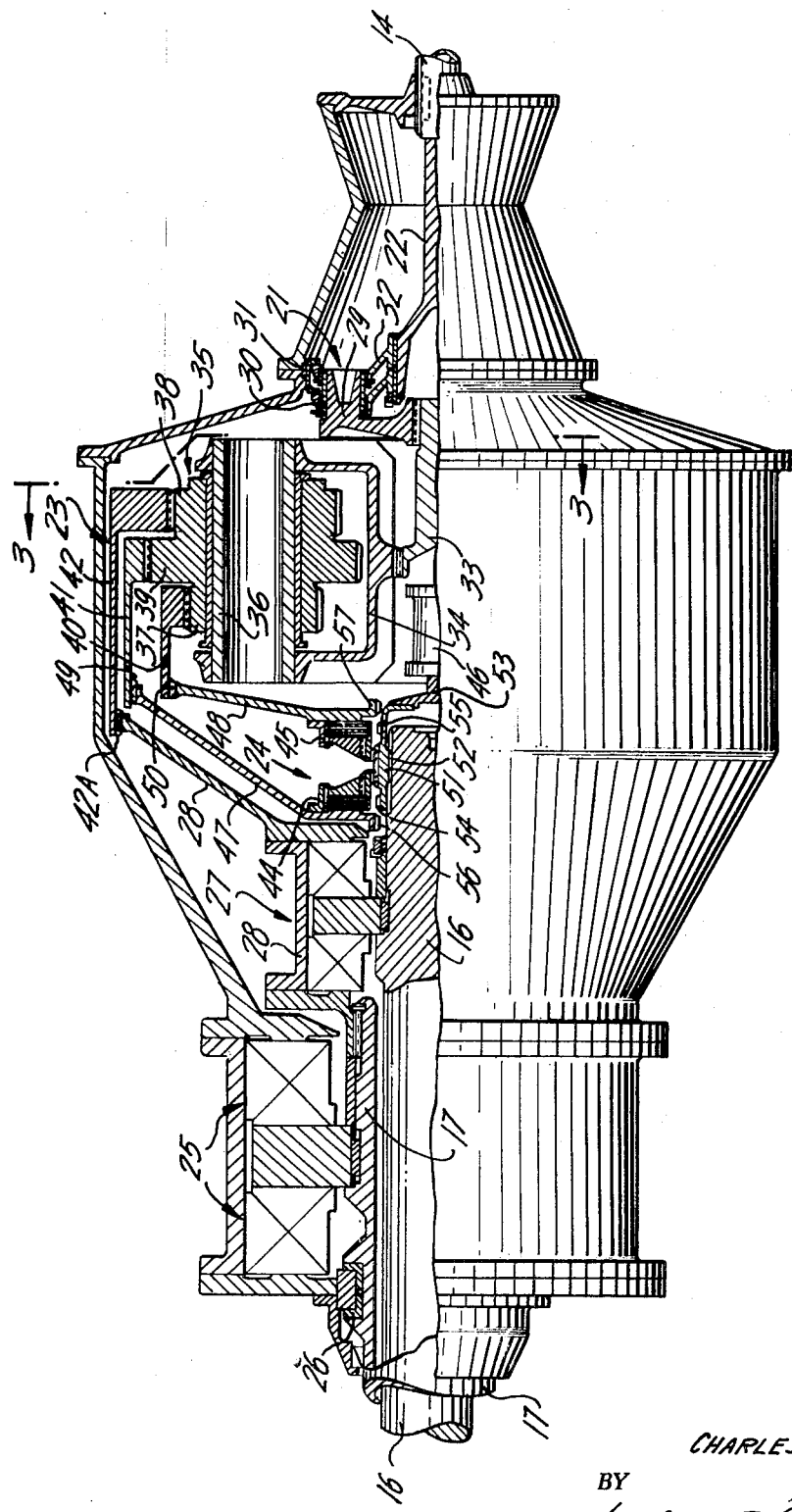

COUNTERROTATING OUTPUT TRANSMISSION

This invention relates to transmissions, and more particularly, to a mechanical transmission capable of transmitting very high torque loads.

BACKGROUND OF THE INVENTION

In high-torque load transmissions such as employed in counterrotating marine propulsion systems, the transmission assemblies are of the locked train, gear reducer type drivably connected to a very large "bull" gear. These transmissions are very large in overall size, the "bull" gear alone having a diameter of about 14 feet for a 40,000 to 60,000 horsepower propulsion system operating at 100 r.p.m. propeller speed. In such conventional marine propulsion systems reverse power transmission is achieved by switching the drive to a reversing engine or, in absence of a reversing engine, providing a complex, bulky locked train, gear reducer transmission having as many as eight clutches. These disadvantages of large size and complexity of conventional transmission assemblies are particularly objectionable in marine applications where usable cargo space is reduced by such large assemblies.

It is therefore an object of this invention to provide a counterrotating output transmission capable of transmitting high torque loads and which is relatively small in size and relatively simple in construction.

Another object of the present invention is to provide a counterrotating output transmission of the compound planetary gear type capable of effecting reversal of rotation of the outputs of the transmission without employing a separate propulsion engine or a multiplicity of clutches.

A further object of the present invention is to provide a counterrotating output transmission of high torque capacity capable of use with a gas turbine prime mover as a source of rotary power in two directions.

A still further object of this invention is to provide a counterrotating output transmission capable of effecting reversal of rotation of the outputs without reversing the rotary power input from the prime mover.

SUMMARY OF THE INVENTION

It is, therefore, contemplated by the present invention to provide a counterrotating output transmission comprising a planetary gear assembly connected to be rotatively driven from a source of rotary power, such as a gas turbine prime mover. The assembly comprises planetary gear members each of which consists of three different sized pinion gears which mesh with and rotatively drive three different sized output ring gears as the pinion gears are caused to planetate or orbit about an axis of rotation. The intermediate sized output ring gear is connected to rotate a first output shaft while the smallest and the largest ring gears are alternately connected to rotate a second output shaft in a direction counter to the rotation of the first output shaft. A clutch assembly, including a switching member preferably of the synchronous, hydraulically actuated type, is constructed and arranged to coact with the smallest and the largest ring gears to alternately connect, as selected, the smallest or largest ring gears to the second output shaft to transmit rotation to the latter in one direction or the other, and also shift the instant center of rotation of the assembly radially relative to the intermediate ring gear to cause change in the direction of rotation of the intermediate ring gear so that the direction of rotation of the first and second counterrotating output shafts is changed.

BRIEF DESCRIPTION OF THE DRAWINGS

The above and other objectives and advantages of the present invention will appear more fully hereinafter from a consideration of the detailed description which follows when taken together with the accompanying drawings wherein one embodiment of the invention is illustrated and in which:

FIG. 2 is a cross-sectional view on an enlarged scale taken substantially along line 2—2 of FIG. 1, with a portion of the transmission housing shown in elevation;

DESCRIPTION OF THE PREFERRED EMBODIMENT

Figure 1:
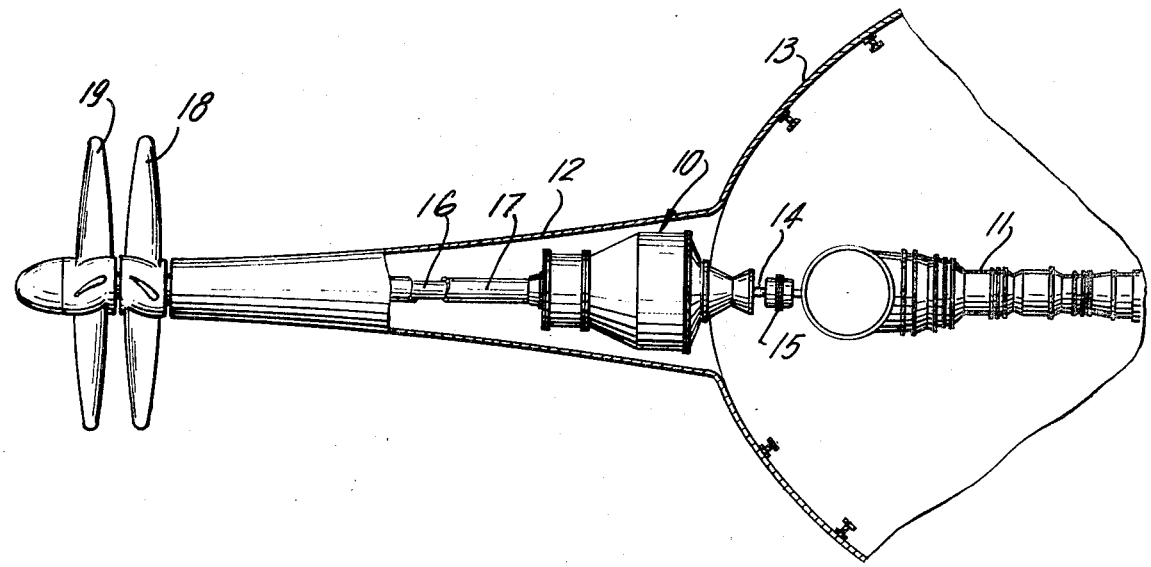
FIG. 1 is a top plan view of a marine propulsion system having a counterrotating transmission according to this invention.

Now referring to the drawings and, more specifically, FIG. 1, the reference number 10 generally designates the counterrotating output transmission according to this invention which is shown as a part of a marine propulsion system. While transmission 10 will be described as applied to a marine propulsion system, the invention is not limited to such application. It is within the purview of the present invention to employ transmission 10 in any apparatus where reversible, counterrotating shafts are required, such as in a liquid mixing apparatus. Also, while transmission 10 is shown drivably connected to a gas turbine engine 11, the transmission is capable of use with a prime mover of any type, such as steam turbines, internal combustion engines, electrical motors, and fluid motors, without departure from the scope and spirit of this invention.

As shown in FIG. 1, transmission 10 is mounted in an elongated, hollow drive shaft housing 12 extending from a hull 13 of a vessel. The gas turbine 11 is disposed in hull 13 and supported in axial alignment with transmission 10. The gas turbine 11 is drivably connected to transmission 10 through a drive shaft 14 and a coupling 15. The opposite end of transmission 10 is connected to rotate, in opposite directions, two coaxially arranged output or propeller shafts 16 and 17. The shafts 16 and 17 are connected to rotate propellers 19 and 18, respectively.

Figure 3:
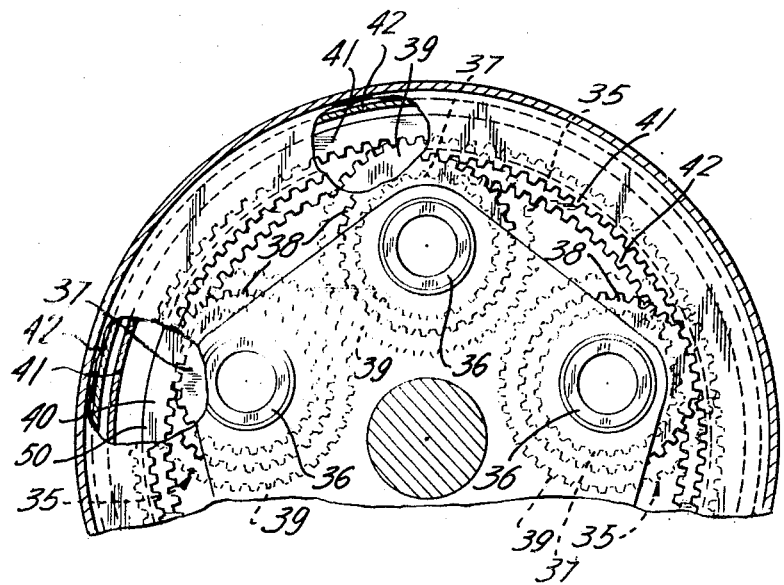
FIG. 3 is a cross-sectional view taken substantially along line 3—3 of FIG. 2.

The transmission 10 comprises, as best illustrated in FIGS. 2 and 3, a housing 20 in which is supported a planetary reduction gear assembly 21 drivably connected to drive shaft 14 by way of a quill 22. Adjacent reduction gear assembly 21 is disposed a torque splitter-reversing assembly 23 which is a planetary gear assembly, including a clutch assembly 24. The clutch assembly 24 is disposed adjacent the end of propeller shaft 16 and is constructed and arranged to effect transmission of rotation from torque splitter-reversing gear assembly 23 to propeller shaft 16. The propeller shaft 17 is supported for rotation within housing 20 by thrust bearing assemblies 25 and radial bearing assembly 26. To rotatively support propeller shaft 16 within propeller shaft 17, a radial and thrust bearing assembly 27 is disposed in an enlarged diameter extension 28 of propeller shaft 17.

The planetary reduction gear assembly 21 comprises a cage 29 which supports a plurality of circumferentially spaced planet gears 30 in meshing relationship with an internal ring gear 31. The internal ring gear 31 is fixed to housing 20, while a sun gear 32 is spline-connected to quill 22 for conjoined rotation with the latter. The output of planetary reduction gear assembly 21 is through cage 29 which is spline connected to the hub portion 33 of the planet cage 34 of torque splitter-reversing assembly 23.

The torque splitter-reversing assembly 23 includes, in addition to cage 34, a plurality of circumferentially spaced compound planetary gear members 35, each of which is supported for rotation about their respective axes simultaneously with rotation about the axis of cage 34 by a trunnion 36 carried by cage 34. Each of the gear members 35 comprises three pinion gears 37, 38, and 39 of different pitch diameters which mesh with three internal ring gears 40, 41, and 42, respectively, of different pitch diameters. The intermediate sized pinion gear 38 meshes with internal ring gear 42 which is spline connected at 42A to enlarged diameter extension 28 of propeller shaft 17 so that orbital-type movement of gear 38 effects rotation of ring gear 42 which, in turn, rotates propeller shaft 17, through extension 28. The smallest sized planet pinion gear 37 and the largest sized planet pinion gear 39 mesh with ring gears 40 and 41, respectively, which are alternately rotatively connected to drive inner propeller shaft 16 through clutch assembly 24.

Clutch assembly 24 comprises two clutch subassemblies 44 and 45 preferably of the disk plate synchronous type which are alternately engaged and disengaged by a hydraulic, rectilinearly reciprocative actuator 46. The subassembly 44, hereinafter referred to as the "forward clutch" has a dish-shaped support 47 while subassembly 45, hereinafter referred to as the "reverse clutch" has a similar dish-shaped support 48. The support 47 of forward clutch 44 is spline connected at 49 for conjoined rotation with ring gear 41. Similarly, support 48 of reverse clutch 45 is spline connected at 50 for rotation in unison with ring gear 40. Both the forward and reverse clutches 44 and 45 comprise alternately arranged disks, one set being rotatively connected to supports 47 and 48, respectively, while the other set of disks is rotatively connected to a switching member 51 which is spline connected at 52 to inner shaft 16 and to actuator 46, via connector 53. The spline connection between shaft 16 and switching gear 51 permits transmission of rotation from the latter to shaft 16 as well as axial movement of switching member 51 relative to shaft 16. Switching member 51 has a forward set of spline teeth 54 and an axially spaced rear set of spline teeth 55. The forward and rear set of spline teeth 54 and 55 are constructed and arranged to alternately engage internally splined members 56 and 57, respectively, formed on the respective supports 47 and 48 upon axial movement of switching member 51. More specifically, clutch assembly 24 functions, when actuator 46 is actuated, to cause switching member 51 to move to the right, as viewed in FIG. 2, to bring rear spline set 55 into mesh with internal spline 57 of support 48 and thereby rotatively connect output ring gear 40 with shaft 16. In the other operative position of actuator 46, where switching spline 51 is moved to the left as viewed in FIG. 2, spline set 54 is brought into mesh with internally splined member 56 so that output ring gear 41 is rotatively connected to shaft 16, through clutch 44. Simultaneously, with engagement of splines 54 and 56, splines 55 and 57 are disengaged from each other. It will be apparent hereinafter that the rotation shafts 16 and 17 are counter to each other and that the direction of rotations are dependant upon whether the drive of shaft 16 is through ring gear 40 or 41. The clutch subassemblies 44 and 45 function to assure synchronism of the propeller shaft 16 and engine turbine inertias at the time of effecting the connection between ring gear 40 or 41 and shaft 16.

Figure 4:
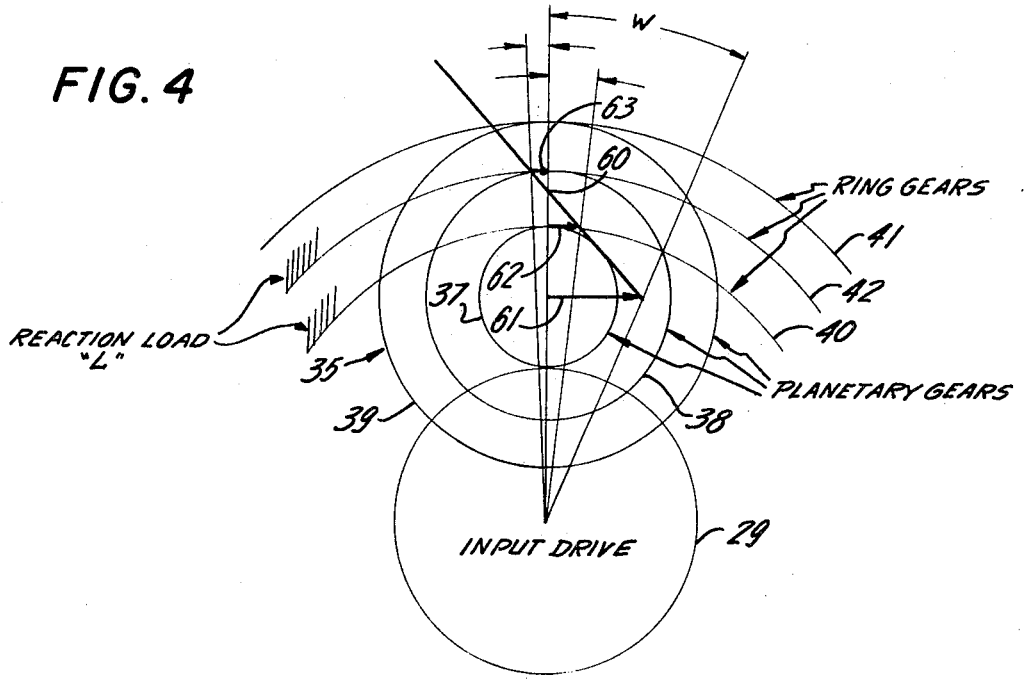
FIG. 4 is a speed vector diagram of the transmission according to this invention in the position for forward or ahead operation; and, FIG. 5 is a speed vector diagram, similar to FIG. 4 showing the transmission in the position for reverse or astern operation.
Figure 5:
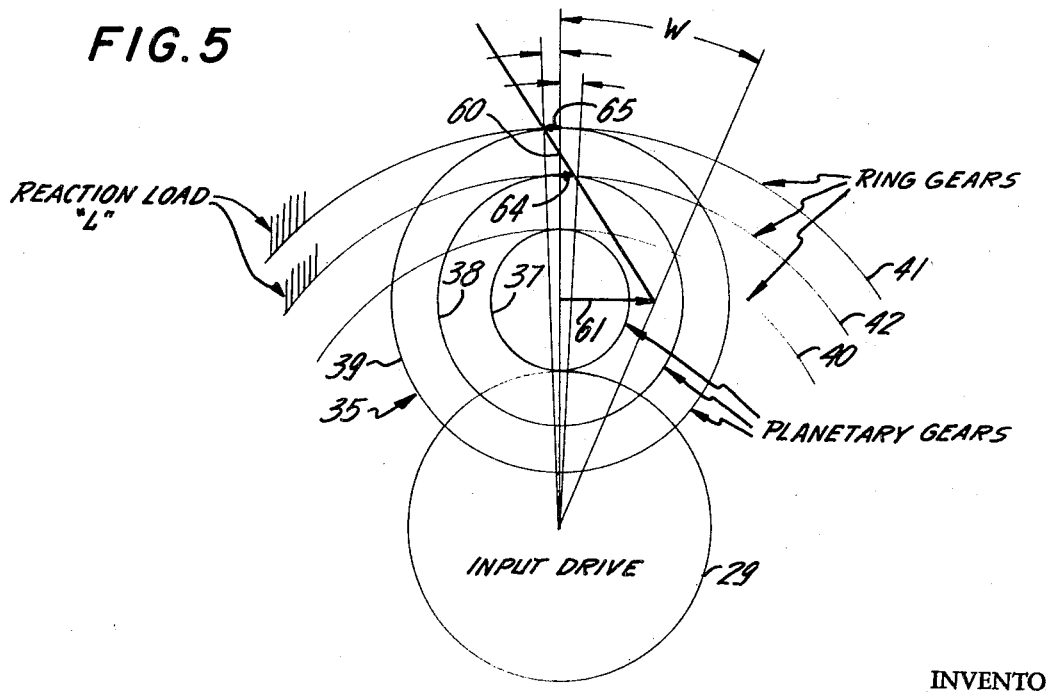

As best illustrated in the velocity vector diagrams of FIGS. 4 and 5, the gears of torque splitter-reversing assembly 23 are so sized that the instant center of rotation 60 of the assembly is located to provide opposite rotation of ring gears 40 and 42 and a change in the direction of rotation of shafts 16 and 17 when clutch assembly 24 is actuated to alter the drive from ring gear 40 to ring gear 41 to cause a shift in the location of center point 60. More specifically as shown in FIG. 4, shafts 16 and 17 are rotatively driven through ring gears 40 and 42 in opposite directions since the instant center point of the assembly is at 60. With the instant center of rotation 60 in a position radially intermediate of ring gears 40 and 42, assuming an angular velocity of planetary gear members 35 of W, and therefore having a rectilinear vector 61, ring gear 40 has a vector 62 while ring gear 42 has an oppositely directed vector 63. The reaction load L on the assembly 23 is supplied by the resistance to rotation encountered by propellers 18 and 19 and transmitted to ring gears 40, 41, and 42 by shafts 16 and 17. As shown in FIG. 5, when switching member 51 is axially translated by actuator 46 to disengage ring gear 40 from shaft 16 and engage ring gear 41 with shaft 16, the instant center of rotation 60 shifts to a location between ring gears 41 and 42. With the center of rotation 60 located between ring gears 41 and 42 and assuming a velocity vector 61 for planetary gear members 35, the direction of rotation of ring gear 42 is reversed and has a velocity vector 64 directed opposite to that of vector 63 (FIG. 4). In this operative condition, ring gear 41 has a velocity vector 65 which is opposite that of velocity vector 62 of ring gear 40 (FIG. 4). Since ring gear 41 is drivably connected to shaft 16, shaft 16 is rotated in a direction opposite to that direction in which it rotates when driven by ring gear 40. Thus, while propellers 18 and 19 are always rotated counter to each other, the effective propulsion force of propellers 18 and 19 can be readily and easily shifted from one direction, such as "ahead," to another, such as "astern." This shifting of propulsion force between ahead and astern is achieved without change of the drive from turbine 11 to another prime mover or reversal of the direction of rotation of the turbine and its drive shaft 14.

The torque splitter-reversing assembly 23, for illustration purposes, may be constructed and arranged so that the speed and torque ratios between the two counterrotating shafts 16 and 17 and between the propellers 18 and 19 provides for rotation of both propellers 18 and 19 at the same speed and with the torque of the forward propeller 18 a little greater than the aft propeller 19. The overall reduction ratio of assembly 23 may be 13:1 and the torque ratio of the forward propeller 18 to the aft propeller 19 may be 1.2:1. A lower torque ratio is impractical because, as the overall reduction ratio rises, a severe centrifugal load is imposed on the planet bearings. The propeller torque ratio in reverse may be 1.2:1 with the aft propeller 19 having a higher torque. Under this latter operative condition the propeller speed ratio in reverse will be about 0.833:1 with the aft propeller 19 turning faster than forward propeller 18.

It is believed now readily apparent that the present invention provides a counterrotating output transmission which is capable of transmitting high torque loads and reversing the direction of output. It is a transmission of structural simplicity and relatively small size in relation to horsepower output. It is furthermore a transmission capable of using a gas turbine prime mover as a source of rotation in two directions.

Although but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. In a rotary transmission, the combination comprising:
   a. a planetary rotation transmission assembly having a plurality of different pitch diameter output members connected to a source of rotary power;
   b. two output shafts;
   c. an intermediate pitch diameter output member connected to one of said output shafts to rotate the latter;
   d. switching means for rotatively connecting the other of said two output shafts alternately with a smaller and a larger pitch diameter output member than the intermediate pitch diameter output member; and
   e. the planetary gear assembly being constructed and arranged that the instant center of rotation of the assembly upon actuation of said switch means shifts in location radially relative to the intermediate pitch diameter output member to effect change in the direction of rotation of the intermediate pitch diameter output member.

2. The combination of claim 1 wherein said output members are ring gears.

3. The combination of claim 1 wherein said planetary rotation transmission assembly comprises planet gears of different pitch diameters and wherein the output members are ring gears disposed in drivable meshing relationship with the planet gears.

4. The combination of claim 1 wherein the switch means includes a synchronous gear clutch assembly.

5. The combination of claim 1 wherein said output shafts are telescopically disposed with respect to each other.

6. A counterrotating output transmission comprising:

a. cage;
b. means for rotatively driving said cage;
c. a plurality of circumferentially spaced planetary gear members supported by said cage;
d. each planetary gear member comprising at least three pinion gears of different pitch diameters;
e. at least three output ring gears of different pitch diameters disposed to mesh one with each of said pinion gears;
f. two output shafts supported for rotation adjacent said planetary gear members;
g. the intermediate-sized output ring gear being connected to one of said shafts to rotate the latter;
h. switching means for rotatively connecting the other of said two output shafts alternately with the smallest and largest sized output ring gears; and
i. the planetary gear members and ring gears being so sized that the instant center of rotation of the assembly upon actuation of said switch means shifts in location radially relative to the intermediate sized ring gear to effect change in the direction of rotation of the intermediate sized ring gear.

7. The apparatus of claim 6 wherein said switching means includes a clutch means.

8. The apparatus of claim 6 wherein each planetary gear member is supported on a trunnion mounted on the cage.

9. The apparatus of claim 6 wherein said switching means includes a multidisk type clutch.

10. The apparatus of claim 6 wherein said switching means includes a synchronous switching gear actuated by a hydraulic cylinder.

11. The apparatus of claim 6 wherein a planetary reduction gear assembly having an output member is provided to rotatively drive said cage.

* * * * *